United States Patent [19]

Tarancon

[11] Patent Number: 5,628,894
[45] Date of Patent: May 13, 1997

[54] NITROGEN TRIFLUORIDE PROCESS

[75] Inventor: Gregorio Tarancon, High Springs, Fla.

[73] Assignee: Florida Scientific Laboratories, Inc., High Springs, Fla.

[21] Appl. No.: 544,073

[22] Filed: Oct. 17, 1995

[51] Int. Cl.$^6$ .............................. C25B 1/24; C25B 15/08; C01B 21/16
[52] U.S. Cl. .................. 205/359; 205/360; 205/411; 423/408; 423/DIG. 12
[58] Field of Search .................................. 205/359, 360, 205/394, 395, 411; 423/408, DIG. 12

[56] References Cited

U.S. PATENT DOCUMENTS

| | | | |
|---|---|---|---|
| 3,235,474 | 2/1966 | Tompkins, Jr. et al. | 205/360 X |
| 3,304,248 | 2/1967 | Fullam et al. | 423/408 X |
| 4,804,447 | 2/1989 | Sartori | 205/360 |
| 5,084,156 | 1/1992 | Iwanaga et al. | 205/359 X |

*Primary Examiner*—Donald R. Valentine
*Attorney, Agent, or Firm*—Ezra Sutton

[57] ABSTRACT

A method for the production of nitrogen trifluoride ($NF_3$) and hydrogen ($H_2$) gas, starting with a molten flux including at least ammonia ($NH_3$), a metal fluoride, and hydrogen fluoride (HF), including the steps of: circulating the molten flux from an electrolyzer, to an ammonia solubilizer, to a nitrogen trifluoride reactor, to a hydrogen fluoride solubilizer, and back to the electrolyzer; maintaining the quantity of the molten flux substantially constant by adding ammonia ($NH_3$) and a carrier gas to the ammonia solubilizer and by adding hydrogen fluoride (HF) and a carrier gas to the hydrogen fluoride solubilizer; producing fluorine ($F_2$) gas and hydrogen ($H_2$) gas in the electrolyzer; transferring the carrier gas from at least one of the solubilizers to the nitrogen trifluoride reactor; mixing the fluorine gas and the carrier gas and supplying the mixed gases to the nitrogen trifluoride reactor; reacting the fluorine gas with the molten flux in the nitrogen trifluoride reactor to produce nitrogen trifluoride ($NF_3$); and collecting the nitrogen trifluoride ($NF_3$) produced at a nitrogen trifluoride condenser and collecting the hydrogen ($H_2$) produced at a hydrogen condenser.

23 Claims, 10 Drawing Sheets

PREDICTION OF MELTING POINT CURVE
OF MOLTEN FLUX SYSTEM FROM THE MELTING
POINT CURVES OF THE A & B SYSTEMS.

Ⓐ PHASE DIAGRAM OF $NH_3$/HF SYSTEM
(PUBLISHED IN ANORG CHEM 212; 399; 1933)
STICKSTOFFFLOURIDE TEILDIAGRAMM DES SYSTEMS $NH_3$/HF
OTTO VON RUFF & LISBET STAUB

Ⓑ PHASE DIAGRAM OF KF-HF SYSTEM
CADY J. AM CHEM SC
56 (1934) 1431

NITROGEN TRIFLUORIDE PROCESS

FIELD OF THE INVENTION

This invention relates to a process and apparatus for producing nitrogen trifluoride ($NF_3$) by the direct fluorination of ammonia ($NH_3$) using molecular fluorine gas ($F_2$) in a liquid medium of molten flux containing ammonia, a metal fluoride and hydrogen fluoride.

BACKGROUND OF THE INVENTION

Nitrogen trifluoride ($NF_3$) is a colorless gas under normal conditions and has a boiling point of about $-129°$ C. and a melting point of about $-208°$ C. Nitrogen trifluoride ($NF_3$) has little odor. However, commercial grades contaminated with trace levels of active fluorides have a pungent, musty odor. $NF_3$ is an oxidizer that is thermodynamically stable at elevated temperatures. At temperatures up to about $662°$ F. ($350°$ C.), its reactivity is comparable to oxygen. At higher temperatures, its reactivity is similar to fluorine owing to appreciable dissociation into $NF_2^+$ and $F^-$. The thermal dissociation of $NF_3$ has been found to peak in the temperature range of $1100°$ to $15000°$ Kelvin. $NF_3$ acts primarily upon the elements as a fluorinating agent, but not a very active one at lower temperatures. At elevated temperatures, $NF_3$ pyrolyzes with many of the elements to produce nitrogen tetrafluoride ($N_2F_4$) and the corresponding fluoride. The pyrolysis of $NF_3$ over copper turnings produces $N_2F_4$ in a 62–71% yield at $707°$ F. ($375°$ C.). Pyrolysis over carbon is more favorable. Hydrogen reacts with $NF_3$ with the rapid liberation of large amounts of heat and is the basis for the use of $NF_3$ in high-energy chemical lasers. The flammability range for $NF_3/H_2$ mixtures is 9.4–95 mole % of $NF_3$. $NF_3$ reacts with organic compounds, but generally an elevated temperature is required to initiate the reaction. Under these conditions, the reaction will often proceed explosively and great care must be exercised when exposing $NF_3$ to organic compounds. Therefore, $NF_3$ has found little use as a fluorinating agent for organic compounds.

Nitrogen trifluoride has been used successfully in large quantities as a fluorine source for high energy chemical lasers. It is preferred over fluorine because of its comparative ease of handling at ambient conditions. $NF_3$ has been used as a source of fluorine in the preparation of fluoroolefins, and as an oxidizer for high energy level. Recently, an increasing amount of $NF_3$ is being used in the semi-conductor industry as a cleaning agent and as a dry etchant, showing significantly higher etching rates and selectivities when compared to carbon tetrafluoride ($CF_4$) and mixtures of $CF_4$ and oxygen. It is used to clean semiconductor micro chips and silicon wafers. Minor amounts of $NF_3$ are used as a chemical intermediate in the production of tetrafluorohydrazine and a series of perfluoroammonium salts. $NF_3$ was also used as an oxidizer in rocketry in the early 1960's, but this application was not commercialized.

There remains a need for an efficient manufacturing apparatus and method for the continuous production and generation of nitrogen trifluoride ($NF_3$) while producing no by-products.

DESCRIPTION OF THE PRIOR ART

Various apparatus and methods of producing nitrogen trifluoride ($NF_3$) have been disclosed in the prior art. For example, U.S. Pat. Nos. 4,091,081 and 4,156,598 to Woytek et al disclose the use of a molten ammonium acid mineral fluoride and contacting it with fluorine to make nitrogen trifluoride ($NF_3$). The process produces the by-product $NH_4F$. Also, fluorine and ammonia are mixed in the same vessel producing two high-temperature exothermic reactions. U.S. Pat. No. 4,804,447 to Sartori discloses the use of salts of ammonia and a salt of hydrazine in an electrolysis process which yields nitrogen trifluoride ($NF_3$) and hydrogen fluoride (HF). U.S. Pat. No. 4,975,259 to Hyakutake et al discloses the electrolysis of ammonium acid mineral fluoride or $KF/NH_4F/HF$ to make nitrogen trifluoride ($NF_3$) and hydrogen ($H_2$). It also employs helium as a carrier gas.

These prior art patents use different chemical compounds and different chemical reaction processes, as compared to the present invention. Also, none of the prior art patents disclose an apparatus having ammonia and hydrogen fluoride solubilizers in conjunction with a fluorine electrolyzer, a nitrogen trifluoride reactor, and condensers or a process for producing nitrogen trifluoride ($NF_3$) and hydrogen ($H_2$), which are commercially sold, and hydrogen fluoride (HF) which is recycled in the process.

Accordingly, it is an object of the present invention to provide an efficient process and apparatus for continuously and automatically producing nitrogen trifluoride ($NF_3$) and hydrogen ($H_2$) from ammonia ($NH_3$) and hydrogen fluoride (HF) using a single molten flux.

Another object of the present invention is to provide a process which is continuous, controllable and automated such that the nitrogen fluoride ($NF_3$) is obtainable without product deterioration (a high quality product is produced) and without any by-products being produced since they are undesirable.

Another object of the present invention is to provide a high purity and a high quality of nitrogen trifluoride ($NF_3$) and hydrogen ($H_2$) which is free from contaminates and impurities such as dinitrogen difluoride ($N_2F_2$), tetrafluorohydrazine ($N_2F_4$), nitrogen oxides ($NO_x$), or solid ammonium fluoride ($NH_4F$).

Another object of the present invention is to provide a system including an electrolyzer, a reactor vessel and solubilizers connected together so that a liquid molten flux flows through them continuously, and wherein ammonia ($NH_3$) and hydrogen fluoride (HF) are supplied to the system and nitrogen trifluoride ($NF_3$) and hydrogen ($H_2$) are produced by the system.

Another object of the present invention is to provide a molten flux containing ammonia ($NH_3$), a metal fluoride (MF) such as potassium fluoride (KF), and hydrogen fluoride (HF), at molar ratios of approximately 3:1:10, respectively.

Another object of the present invention is to provide an ammonia solubilizer wherein the solid formation of ammonia fluoride ($NH_4F$) is prevented when ammonia ($NH_3$) is added to the solubilizer, as a result of the simultaneous introduction of helium (He) gas to the solubilizer with the ammonia $NH_3$.

Another object of the present invention is to provide for a nitrogen trifluoride reactor apparatus having evaporating/cooling components contained therein for removing the exothermic heat of reaction ($\Delta H$) of the process, and heater components for heating the molten flux to the proper temperature range for an efficient process reaction to take place.

Another object of the present invention is to provide helium (He) gas as a carrier gas for ammonia ($NH_3$) and hydrogen fluoride (HF) through the vessels of the present invention in order to avoid explosions and to provide a safe process.

SUMMARY OF THE INVENTION

In accordance with the present invention there is provided an improved and efficient apparatus and process for the production of nitrogen trifluoride ($NF_3$) and hydrogen ($H_2$) gas, starting with a molten flux including ammonia ($NH_3$), a metal fluoride, and hydrogen fluoride (HF). The apparatus includes an electrolyzer vessel, an ammonia solubilizer, a hydrogen fluoride solubilizer, a nitrogen trifluoride reactor, and a pair of condensers. The electrolyzer vessel has a first section for receiving the molten flux and has at least one cathode for producing hydrogen ($H_2$) gas, and has at least one anode for producing fluorine ($F_2$) gas. The electrolyzer vessel also includes a second section for collecting hydrogen ($H_2$) gas and a third section for collecting fluorine ($F_2$) gas. The ammonia solubilizer has a molten flux tank with first inlet means connected to the electrolyzer vessel for receiving the molten flux therefrom, the molten flux tank having first outlet means connected to a nitrogen trifluoride reactor for transferring the molten flux to the nitrogen trifluoride reactor, the ammonia solubilizer having second inlet means for receiving ammonia ($NH_3$) gas and a carrier gas of helium (He), and having second outlet means for supplying the helium (He) gas to the nitrogen trifluoride reactor. The hydrogen fluoride solubilizer has a molten flux tank with first inlet means connected to the trifluoride reactor for receiving the molten flux therefrom. The molten flux tank has first outlet means connected to the electrolyzer vessel for transferring the molten flux to the electrolyzer vessel. The hydrogen fluoride solubilizer has second inlet means for receiving hydrogen fluoride (HF) and a carrier gas of helium (He), and has second outlet means for supplying the helium (He) gas to the nitrogen trifluoride reactor. The nitrogen trifluoride reactor has a molten flux tank with first inlet means connected to the first outlet means of the ammonia solubilizer for receiving the molten flux therefrom. The molten flux tank has first outlet means connected to the first inlet means of the hydrogen fluoride solubilizer for transferring the molten flux thereto. The nitrogen trifluoride reactor has second inlet means connected to the electrolyzer vessel for receiving fluorine ($F_2$) gas therefrom and connected to at least one of the solubilizers for receiving helium (He) gas therefrom. The second inlet means includes means for simultaneously supplying the fluorine ($F_2$) gas and the carrier helium (He) gas to the nitrogen trifluoride reactor. The second outlet means supplies nitrogen trifluoride ($NF_3$) produced in the nitrogen trifluoride reactor to a condenser for recovery of nitrogen trifluoride ($NF_3$) and hydrogen fluoride (HF) gases.

BRIEF DESCRIPTION OF THE DRAWINGS

Further objects, features, and advantages of the present invention will become apparent upon consideration of the detailed description of the presently-preferred embodiments, when taken in conjunction with the accompanying drawings wherein.

DETAILED DESCRIPTION OF THE APPARATUS

OVERVIEW

Figure 1:
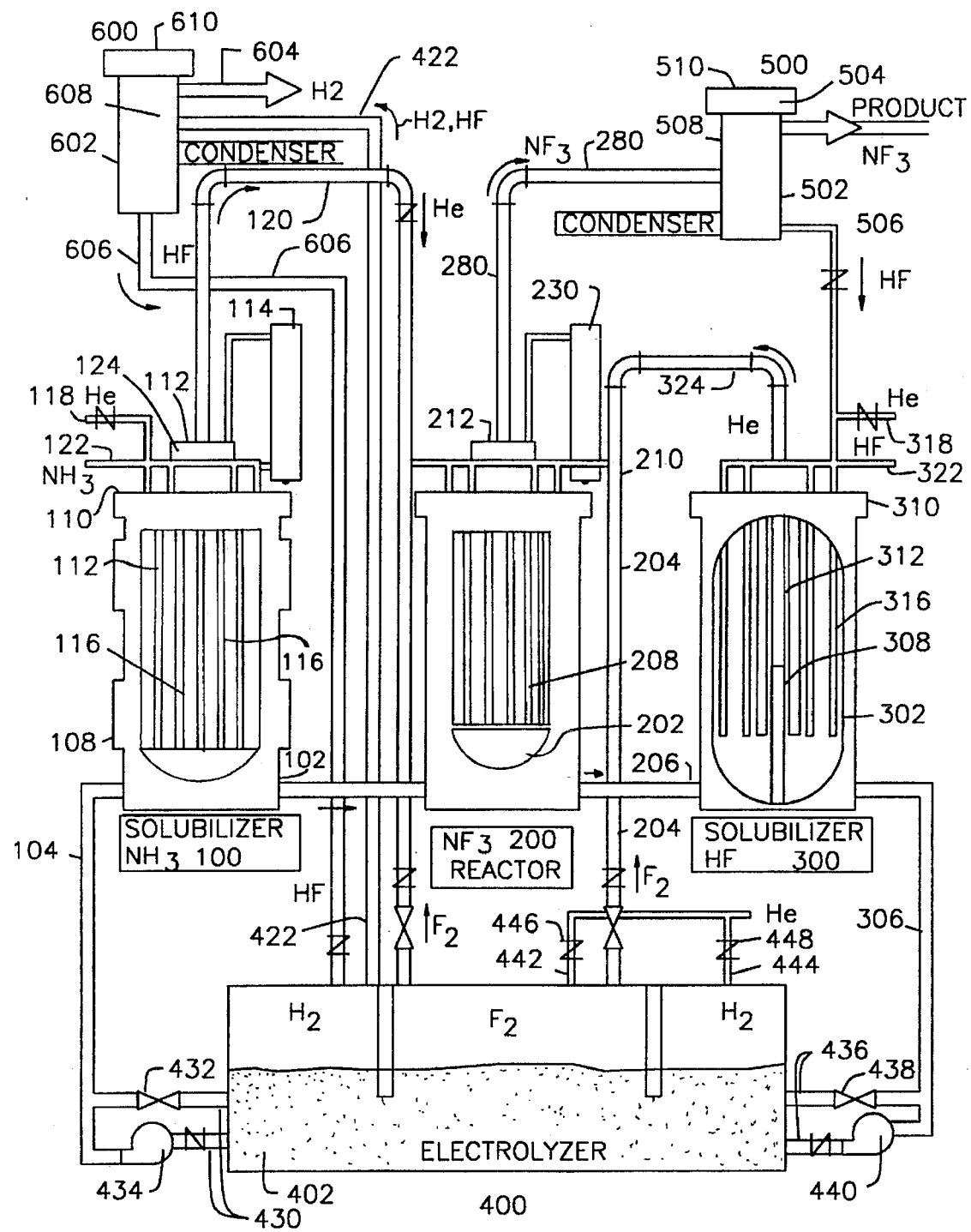
FIG. 1 is a schematic view of the present invention of the nitrogen trifluoride apparatus and process with all major components being shown.
Figure 2:
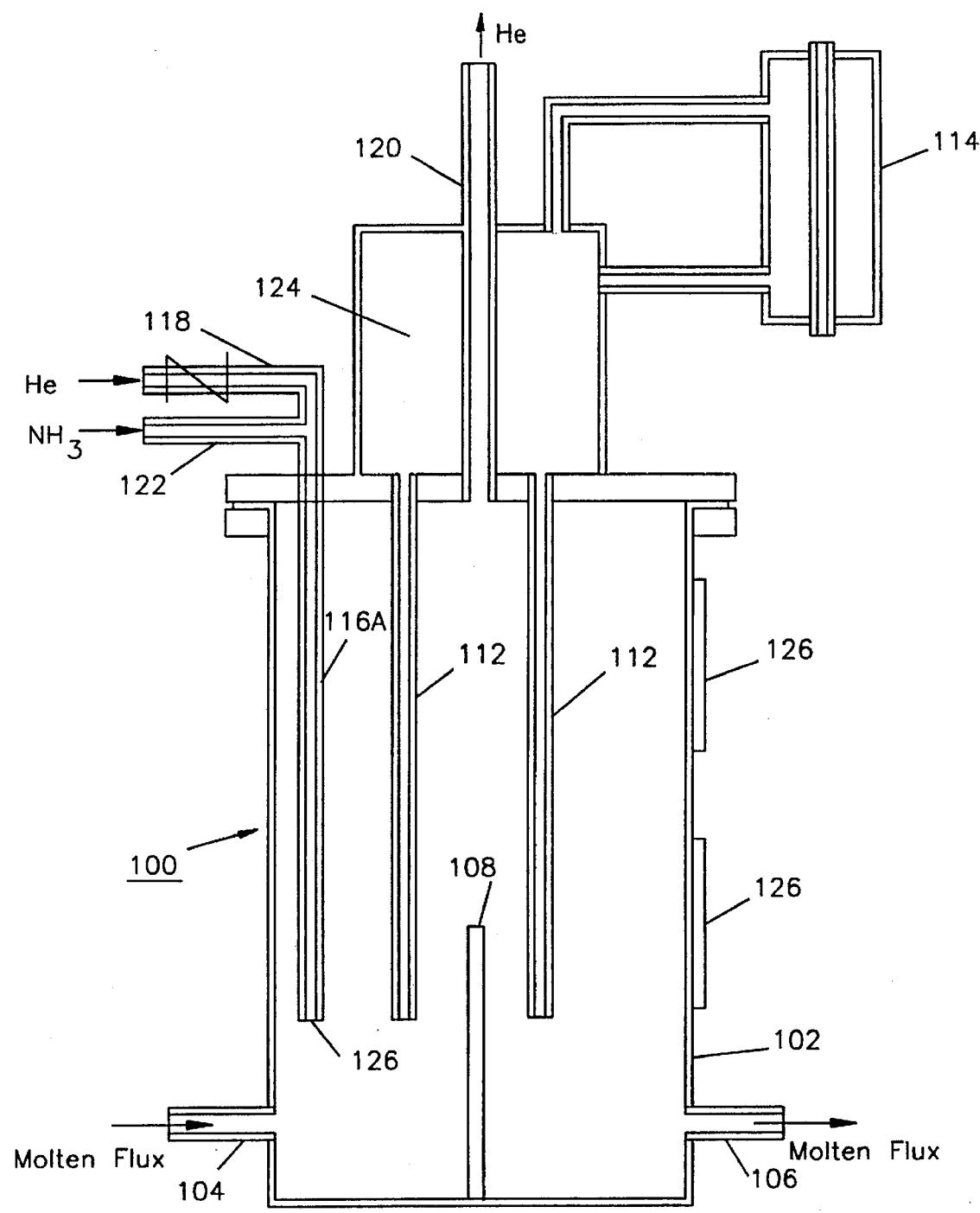
FIG. 2 is a cross-sectional view of the ammonia solubilizer with all major component parts being shown therein.
Figure 3:
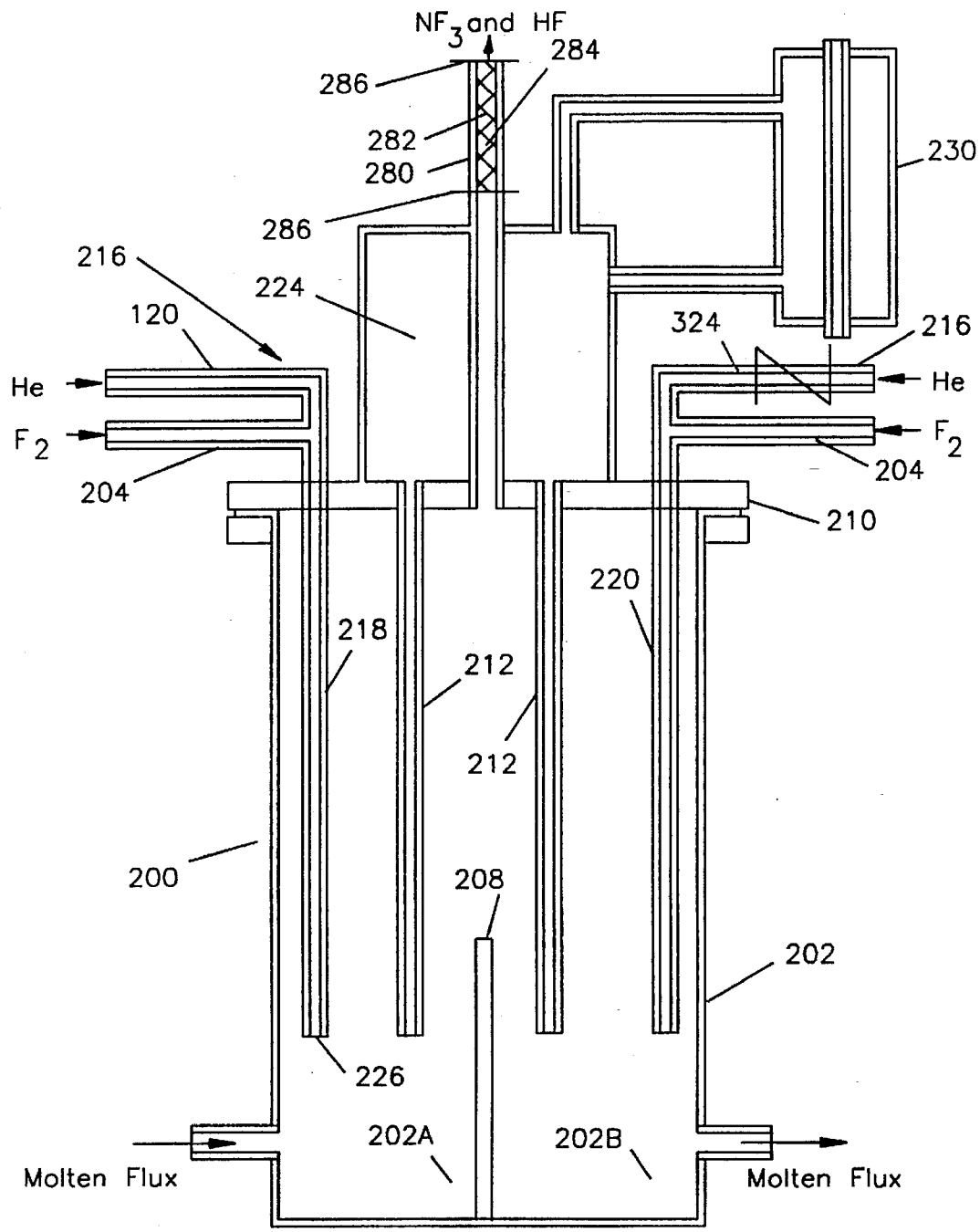
FIG. 3 is a cross-sectional view of the nitrogen trifluoride reactor with all major component parts being shown therein.

The apparatus 10 of the present includes the following major components for producing nitrogen trifluoride: ammonia solubilizer 100, a nitrogen trifluoride reactor 200, a hydrogen fluoride solubilizer 300, an etecholyzer 400, a nitrogen trifluoride and hydrogen fluoride condenser 500, and a hydrogen and hydrogen fluoride condenser 600.

As will be explained herein, a molten flux 20 is circulated continuously through the solubilizers 100 and 300, the reactor 200, and electrolyzer 400. The quantity of molten flux 20 being circulated is maintained substantially constant by adding ammonia to the ammonia solubilizer 100 and by adding hydrogen fluoride to the hydrogen fluoride solubilizer 300, as they are consumed.

The electrolyzer 400 produces fluorine gas and hydrogen gas, and supplies the fluorine gas to the reactor 200 to react with the molten flux 20 contained therein to produce nitrogen trifluoride ($NF_3$). The nitrogen trifluoride ($NF_3$) is collected at condenser 500.

AMMONIA SOLUBILIZER 100

The ammonia solubilizer 100 has a molten flux tank 102, having an inlet pipe 104 and outlet pipe 106. Molten flux 20 is received from the electrolyzer 400 through the inlet pipe 104. The molten flux tank 102 has a baffle 108 for increasing the mixing contact between the molten flux 20 and the ammonia ($NH_3$) gas 22, and it increases the heat transfer ($\Delta T$) of the molten flux 20 to the ammonia ($NH_3$) gas 22.

The ammonia solubilizer 100 has a cover 110 having U-shaped cooling tubes 112 extending downwardly therefrom. The bundle of U-shaped cooling tubes 112 are used to provide the removal of excess heat from the molten flux 20. As ammonia ($NH_3$) gas 22 is added to molten flux, the absorption creates heat, and the cooling tubes 112 remove the heat of absorption of ammonia 22 in the molten flux 20, also referred to as $\Delta H_S$ (heat of solution). Each cooling tube 112 acts as an evaporator. The vapor formed on each cooling tube 112 is released in the vapor chamber 124. Vapor chamber 124 is pressurized to 50 psig and has a pressure gauge 126 for monitoring the vapor chamber pressure. External condenser 114 is used to condensate the vapor produced by the cooling tubes 112.

The cover 110 has four (4) spargers 116a, 116b, 116c, and 116d extending therefrom. The spargers 116a to 116d have an ammonia ($NH_3$) gas 22 feed pipe line 122 and a helium (He) gas 24 feed pipeline 118. The ammonia 22 and helium 24 are bubbled through the molten flux 20 to enrich the molten flux 20 with ammonia ($NH_3$) in the amount of ¼% to ½%. The carrier gas of helium (He) is used to prevent the formation of a solid precipitate of an ammonia fluoride ($NH_4F$) designated 36. The helium line 118 injects helium (He) gas 24 into the sparger bundles 116a to 116d continuously. The ammonia line 122 adds ammonia ($NH_3$) gas 22 to the sparger bundles 116a to 116d continuously or intermittently.

The helium (He) gas 24 bubbles through the molten flux 20 of the ammonia solubilizer 100 and passes to the vapor space 124 of the ammonia solubilizer 100 and then to one side of the spargers 218 of sparger system 216 of the nitrogen trifluoride reactor 200. The helium 24 and ammonia 22 are injected into the spargers 116 and out through sparger holes 126 into the molten flux 20. When ammonia ($NH_3$) gas 22 is introduced through the spargers 116 in the solubilizer 100, helium (He) gas 24 is also injected into the spargers 116 to prevent the formation of solid ammonium fluoride ($NH_4F$) 36 in the sparget holes 126. The formation of solid ammonium fluoride ($NH_4F$) 36 on the surface of the spargers 116 and more specifically on the sparger holes 126 causes plugging which is a serious problem in the prior art. It is novel to recycle the helium (He) carrier gas 24 in a closed loop. The ammonia ($NH_3$) gas 22 introduced through the spargers 116 enriches the mole fraction of the ammonia content ($NH_3$) in the molten flux 20 in the range of ¼% to ½% which then flows to the nitrogen trifluoride reactor 200. All the heat of solution ($\Delta H_s$) generated by the ammonia ($NH_3$) gas 22 addition in the solubilizer 100 is removed by the cooling tubes 112. The molten flux 20 enriched with ammonia ($NH_3$) gas 22 flows through the pipe line 106 into the nitrogen trifluoride reactor 200 at a proper temperature without excess heat.

The solubilizer 100 is made of a monel 400 sleeve being 12" in diameter and 24" in length. The sleeve is supported with a carbon steel cartridge made of carbon steel 12" standard pipe. The sleeve cartridge has a bottom plate and a slip-on flange at the top. The slip-on flange is joined with a 150 lb. blind flange which serves as a cover for the solubilizer. The solubilizer tank 102 has three bottom connections of ¾" NPT. The cooling pipes 112 are made of monel 400. Each pipe 112 is made using a 1.5" monel pipe that is 24" in length. There are six cooling pipes 112 in solubilizer 100. The spargers 116a to 116d in the solubilizer 100 are made of ½" monel tubing. There is a minimum of three spargers in solubilizer 100. There is another sparget for the return of hydrogen fluoride (HF) gas 26 from the condenser 114 which is part of the sparger system 116a to 116d. The solubilizer 100 has an external electrical heating element 126 for the start-up condition, and it kept on stand-by for the heat balancing of the nitrogen trifluoride system 10.

NITROGEN TRIFLUORIDE REACTOR 200

The nitrogen trifluoride reactor 200 has a molten flux tank 202, having an inlet pipe 106, an outlet pipe 206, and a baffle 208. The baffle 208 divides the molten flux tank 202 into two compartments, 202A and 202B, and baffle 208 increases the mixing contact between molten flux 20 and fluorine ($F_2$) gas 26. The molten flux 20 flows from the ammonia solubilizer 100 into the nitrogen trifluoride reactor 200 through inlet pipe 106. The nitrogen trifluoride reactor 200 has a cover 210 having a bundle of U-shaped cooling pipes 212 extending downwardly therefrom to provide the necessary cooling to the molten flux 20 in this zone. The heat of reaction ($\Delta H_R$) of fluorine ($F_2$) gas 26 with the ammonia ($NH_3$) component 22 of the molten flux 20 to generate nitrogen trifluoride ($NF_3$) gas 30 is removed by the cooling effect of cooling pipes 212. Each cooling pipe constitutes the heat transfer element of an evaporator. The vapor formed out of each cooling pipe is released into the vapor chamber 224. The steam accumulated in the vapor chamber 224 is condensed in an external condenser 230. The condensate from the steam of chamber 224 is returned by gravity from condenser 230 to chamber 224. Vapor chamber 224 is pressurized to 50 psig to maximize the cooling effect of cooling pipes 212.

The cover 210 also has a sparget system 216 divided in two bundles, sparger bundle 218 on the ammonia solubilizer side, and sparger bundle 220 on the hydrogen fluoride solubilizer side. Each sparger bundle 218 and 220 has three spargers 218a, 218b, and 218c; and 220a, 220b, and 220c, respectively. The sparget bundle 218 injects fluorine gas from the electrolyzer 400 and helium gas from the ammonia solubilizer 100 into compartment 202A of the nitrogen trifluoride reactor 200. The helium (He) gas 24 from ammonia solubilizer 100 is injected into sparger bundle 218 through the feed line 118, and the fluorine ($F_2$) gas 26 is injected into sparger bundle 218 through the pipe line 210. The helium (He) gas 24 is fed continuously into nitrogen trifluoride reactor 200 through sparget bundle 218 and sparget bundle 220. The helium (He) and fluorine ($F_2$) gases 24 and 26 from sparget bundle 218 and from sparger bundle 220 are fed into separate compartments of the nitrogen trifluoride reactor 200. This mechanism of using helium (He) gas 24 as a carrier gas prevents hydrogen fluoride from contacting ammonia in the vapor space to form a solid and plug the pipe line 120.

The nitrogen trifluoride ($NF_3$) gas 30 produced in reactor 200 passes through dimister pipe 280 which has a bundle of metal strips 282. The bundle of strips 282 consist of eight strips 36"×¾"×⅛" made of nickel-alloy metal. The bundle of strips 282 are twisted into four helical configurations 284. When gaseous nitrogen trifluoride ($NF_3$) with helium (He) gas 24 are passed through the dimister pipe 280 any material suspending from the molten flux 20 is trapped and returned to the molten flux tank 202 of the nitrogen trifluoride reactor 200. To prevent any solid from remaining in the strips 282 of the dimister pipe 280, the dimister pipe 280 is heated by an electrical heating element 286. The temperature of the dimister pipe 280 is maintained in the range of 200° C. to 300° C.

Nitrogen trifluoride ($NF_3$) gas 30 is produced in the molten flux 20, and it bubbles into the helium (He) atmosphere. The helium (He) concentration 24 is in the range of 5% to 50% by volume. Once the nitrogen trifluoride ($NF_3$) gas 30 is passed through the nitrogen trifluoride/hydrogen fluoride condenser 500 the hydrogen fluoride (HF) 28 is removed. The helium (He) gas 24 is removed by passing the gas mixture of nitrogen trifluoride ($NF_3$) and helium (He) through the liquid nitrogen freeze trap 290.

The molten flux tank 202 is a monel tank with a diameter of 12" by 42" in length, and a wall thickness of 0.125." This tank has a flat bottom and flange at the top. All of the wet parts of this vessel are made of monel 400. The supports and holder for the tank are made of carbon steel. At the bottom of the sleeve is a 12"×18" baffle plate 208 made of monel 400.

The cover 210 is made of flat monel clad in a 150 lb. carbon steel blind flange. On the monel side, there are six 1.5" cooling pipes 212. On the carbon steel side, there is a small vapor chamber 224 of 10" in diameter by 10" in height. The open upper ends of the six monel cooling pipes 212 are connected to the carbon steel vapor chamber 224 and are maintained at a steam pressure of 50 psig. The cover 210 also has six spargers 218a, 218b, 218c, 220a, 220b, and 220c of ¾" O.D.×0.083 wall monel tubing that are 38" in length. There are two ¼" connections for temperature sensors and one 3" connection for the nitrogen trifluoride ($NF_3$) gas stream from outlet pipe 294 out of the reactor 200. The 3" section is made of monel 400, schedule 10-5. In the 3" section, there are three connections: one for instrument read-out, one for pressure release and one for the nitrogen triflouride ($NF_3$) gas 30.

There is a carbon steel cartridge or tank made with 12" standard pipe with a flat plate welded to the bottom and a 150 lb. slip-on flange welded at the top. A modified 12" blind flange is used for the cover 210 of the reactor 200. It simultaneously seals the tank and serves the purpose of holding the cooling tubes 212 of the reactor 200, the fluorine sparget system, the mister of nitrogen trifluoride ($NF_3$) gas 30 and the pressure, temperature and level sensors for the reactor. The overall dimensions of the reactor 200 are (including the demister section) about eighteen inches (18") in diameter and eight feet (8') in height.

HYDROGEN FLUORIDE SOLUBILIZER 300

The hydrogen fluoride solubilizer 300 has a molten flux tank 302, having an inlet pipe 206 and an outlet pipe 306. Molten flux 20 is received from the nitrogen trifluoride reactor 200 through inlet pipe 206. The molten flux tank 302 has a baffle 308 which divides tank 302 into two compartments 302A and 302B, and increases the mixing contact between molten flux 20 and hydrogen fluoride (HF) gas 28, and it increases the heat transfer ($\Delta T$) of molten flux 20 to the hydrogen fluoride (HF) gas 28. Baffle 308 provides for different and distinct temperature gradients of the molten flux 20 within each compartment 302A and 302B of tank 302.

The hydrogen fluoride solubilizer 300 has a cover 310 having U-shaped cooling tubes 312 extending downwardly from the cover so that flux 20 passes through the U-shaped cooling tubes. Cooling tubes 312 are used for the removal of heat ($\Delta T$) from the molten flux 20 which brings the temperature of the molten flux 20 from about 160° C. to a set temperature of about 60° C. to supply the electrolyzer 400. In addition, as hydrogen fluoride (HF) gas 28 is added to molten flux 20, the absorption creates heat, and the cooling tubes 312 also remove the heat of absorption ($\Delta H_A$), also referred to as the heat of solution ($\Delta H_S$).

Figure 4:
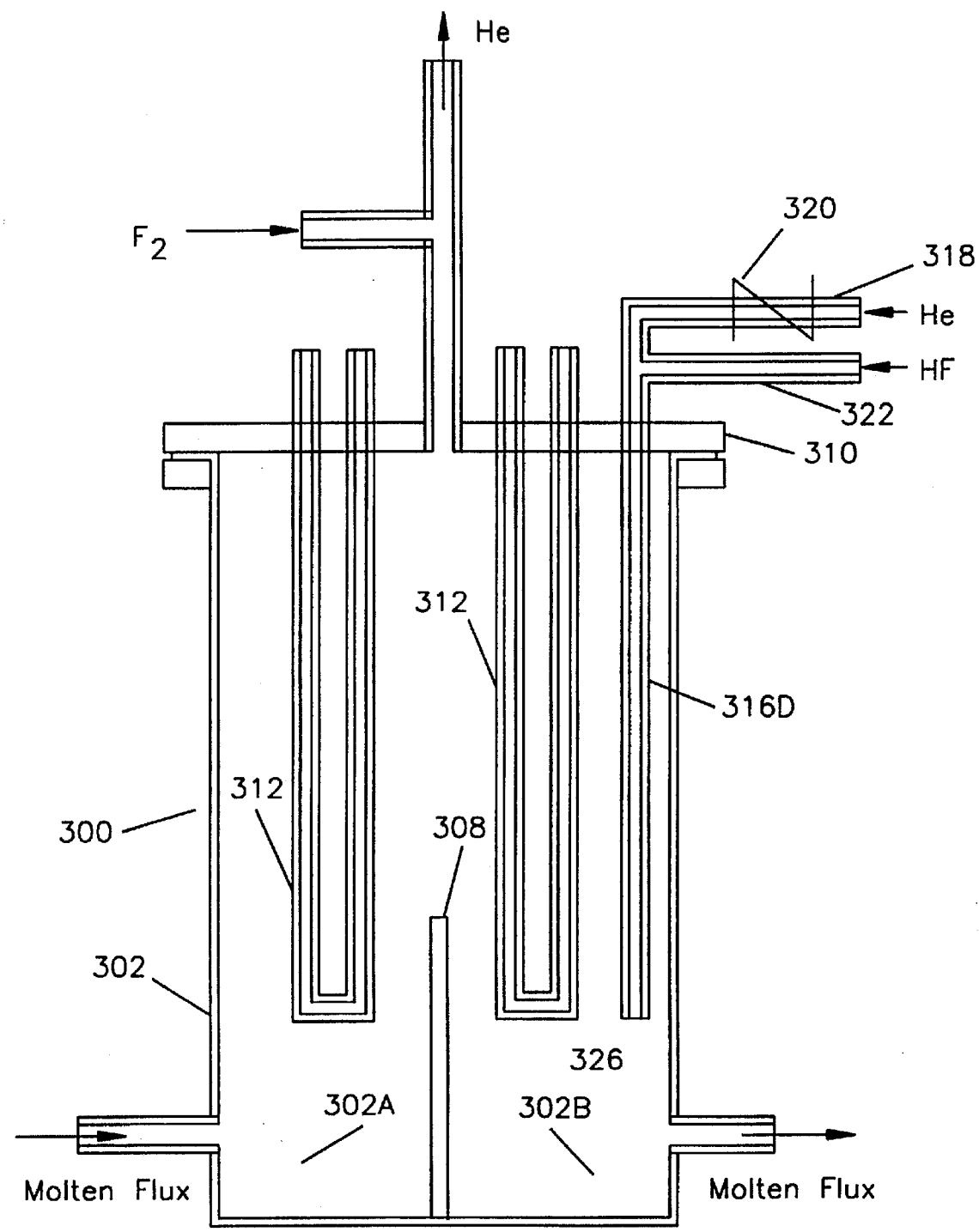
FIG. 4 is a cross-sectional view of the hydrogen fluoride solubilizer with all major component parts being shown therein.
Figure 5:
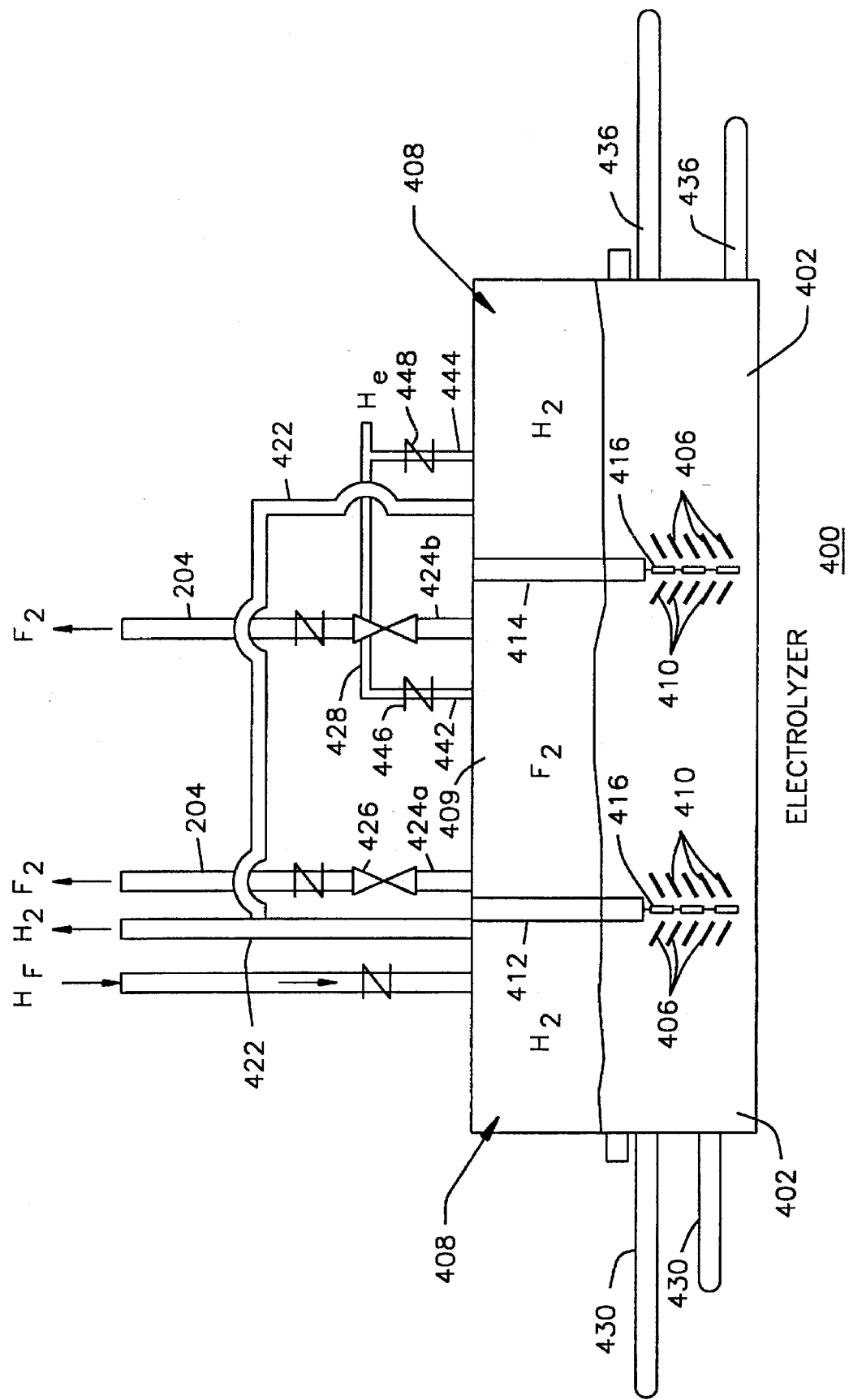
FIG. 5 is a cross-sectional view of the electrolyzer with all major component parts being shown therein.

The cover 310 also includes four (4) bundles of spargers 316a, 316b, 316c, and 316d extending downwardly therefrom for the injection of hydrogen fluoride (HF) gas 28 and helium (He) gas 24 into the molten flux 20. The helium (He) gas 24 and hydrogen fluoride (HF) gas 28 are bubbled through the molten flux 20 to further enrich the flux with hydrogen fluoride (HF). The helium (He) gas 24 is injected into the spargers 316a to 316d through pipeline 318, and concurrently, the hydrogen fluoride (HF) gas 28 is injected into the spargers 316a to 316d through pipeline 322. The spargers have holes 326 for injecting the helium (He) and hydrogen fluoride (HF) gases 24 and 28 into flux 20. Pipeline 318 has an automatic valve 320 for the metering in of helium (He) gas 24 at a specific rate to the solubilizer 300, which prevents the formation of the solid precipitate of ammonia fluoride ($NH_4F$) 36. Helium (He) gas 24 passes from solubilizer 300 to the reactor 200 via pipeline 324. The main functions of the hydrogen fluoride solubilizer 300 are to cool down the molten flux 20 and to enrich the molten flux 20 with additional hydrogen fluoride (HF) gas 28 from condenser 500 and/or pipe line 322, as the hydrogen fluoride (HF) is converted in the chemical reaction which takes place in the electrolyzer 400. This is depicted in FIGS. 1 and 4.

The solubilizer 300 is made of a monel 400 sleeve being 12" in diameter and 24" in length. The sleeve is supported with a carbon steel cartridge made of carbon steel 12" standard pipe. The sleeve cartridge has a bottom plate and a slip-on flange at the top. The slip-on flange is joined with a 150 lb. blind flange which serves as a cover for the solubilizer. The solubilizer tank 302 has three bottom connections of ¾" NPT. The cooling pipes 312 are made of monel 400. Each pipe is made using a 1.5" monel pipe that is 24" in length. There are six cooling pipes 312 in solubilizer 300. The spargers 316a to 316d in solubilizer 300 are made of ½" monel tubing. There are a minimum of three spargers per solubilizer.

FLUORINE-HYDROGEN ELECTROLYZER 400

The two solubilizers 100 and 300 are connected to electrolyzer 400. HF solubilizer 300 supplies molten flux 20 to the electrolyzer, and in return, the electrolyzer supplies molten flux 20 to ammonia solubilizer 100. The electrolyzer and flux 20 used in the $NF_3$ process are made specifically for this process. Electrolyzer 400 operates at approximately 40° C. to 60° C. with a concentration of hydrogen fluoride (HF) in the range of 68 to 72 mole %, with the balance of molten flux 20 containing ammonia $NH_3$ and potassium fluoride (KF). The number of moles of ammonia ($NH_3$) is $\geq$ the number of moles of potassium fluoride (KF). Electrolyzer 400 is made of a ultra high molecular weight polyethylene; monel is used for the anode 410; carbon steel, monel, or stainless steel is used for the cathode 406; and Teflon Nafion™ is used for the membrane 416.

Figure 6:
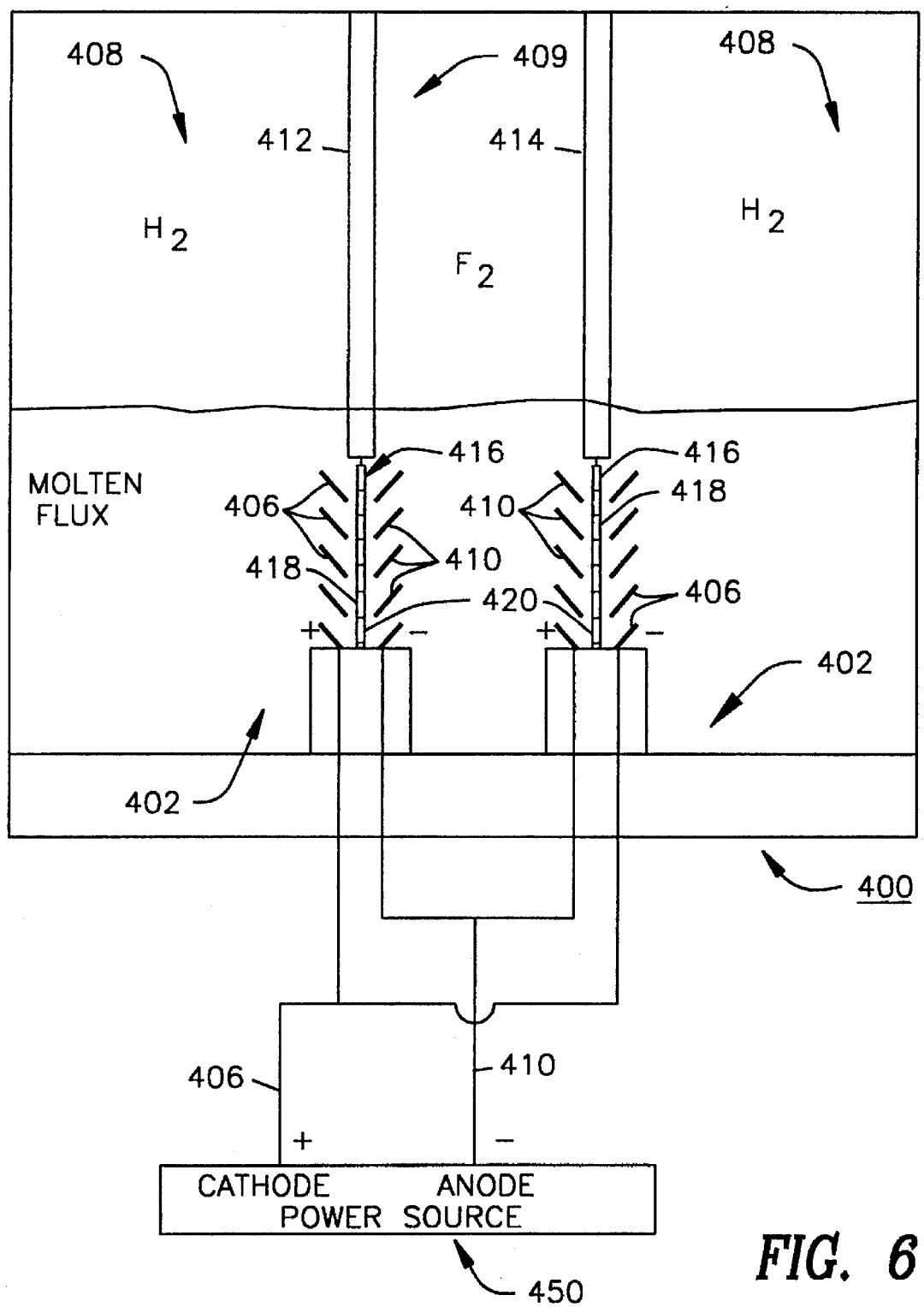
FIG. 6 is a schematic view of the electrolyzer showing the electrical diagram of the cathode and anode connected to a power source.
Figure 7:
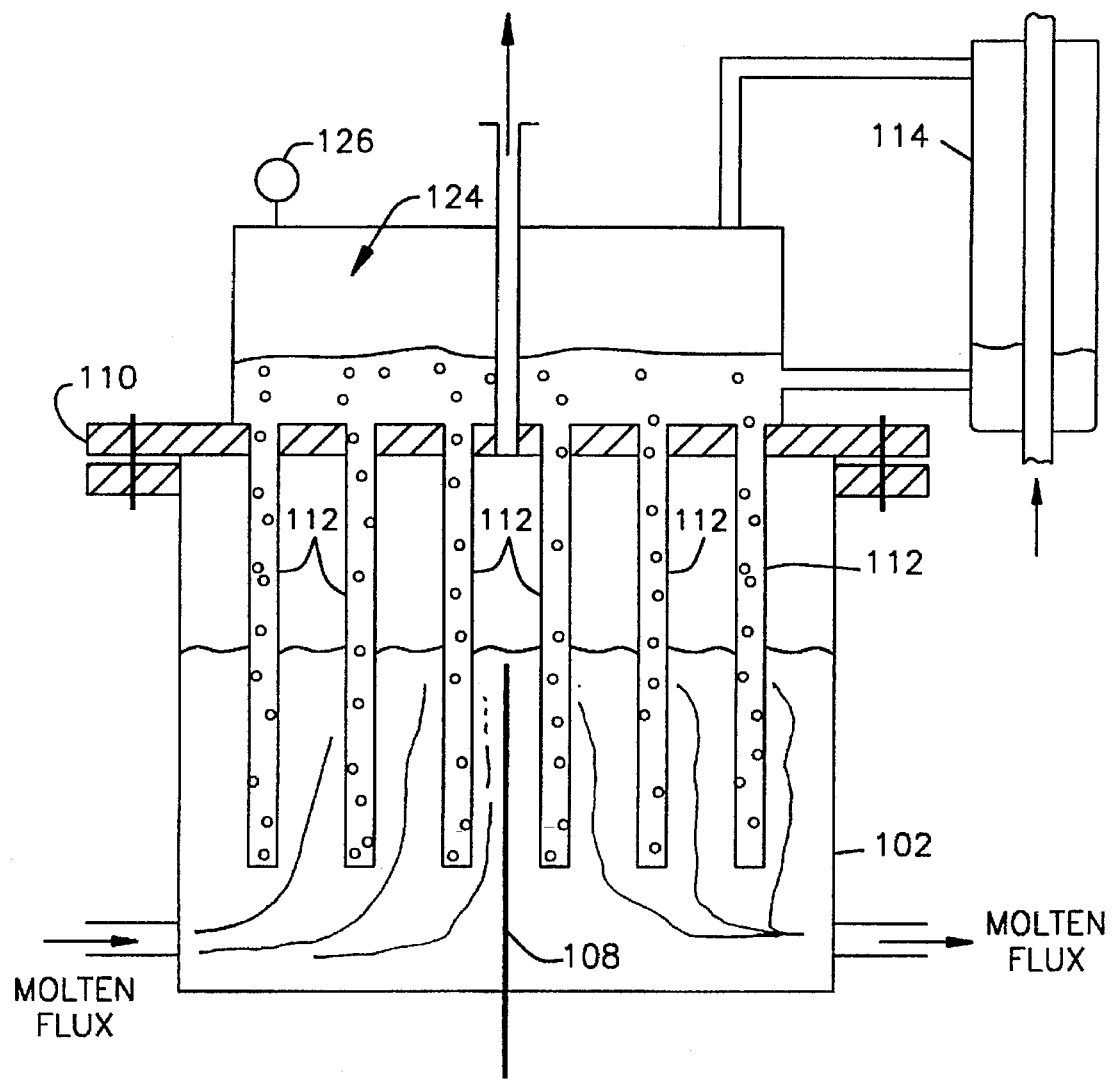
FIG. 7 is a cross-sectional view of the ammonia solubilizer showing the cooling tubes, vapor chamber, and external condenser in detail.

The fluorine-hydrogen electrolyzer 400 includes a first section being a molten flux tank 402 for holding of the molten flux 20. Section 402 also includes a plurality of cathodes 406 for producing hydrogen ($H_2$) gas 32, and a plurality of anodes 410 for producing fluorine ($F_2$) gas. Electrolyzer 400 further includes upper baffles 412 and 414 which define two upper hydrogen gas collecting sections 408 and an upper fluorine gas collecting section 409. Baffles 412 and 414 have a Teflon membrane 416 attached to their lower ends for transferring the molten flux 20 between sections of the molten tank 402. The outer wall 418 of membrane 416 has the cathodes 406 connectedly attached, and conversely, the inner wall 420 of membrane 416 has the anodes 410 connectedly attached. Cathodes 406 and anodes 410 are connected to a power source 450, as depicted in FIG. 6 of the drawings.

Electrolyzer 400 has outlet pipes 422 for the hydrogen ($H_2$) gas 32 which is transferred to condenser 600, a pair of outlet pipes 424a and 424b having automatic valves 426 and 428 for the fluorine ($F_2$) gas 26 which is transferred to reactor 200 via inlet pipes 204, and outlet pipes 430 having an automatic valve 432 and a circulating pump 434 for transferring the molten flux 20 to the ammonia solubilizer 100. Electrolyzer 400 also has an inlet pipe 436 having an automatic valve 438 and a circulating pump 440 for transferring the hydrogen fluoride (HF) enriched molten flux 20 from hydrogen fluoride solubilizer 300 to the molten flux tank 402, and there are a pair of inlet pipes 442 and 444 having valves 446 and 448 for the transfer of helium (He) gas 24 to the gaseous sections 404 and 408.

CONDENSERS 500 AND 600

The two condensers 500 and 600 are made of monel 400 and are esstentually used for the removal of hydrogen fluoride (HF) from the outlet gaseous streams via outlet pipes 280 and 422. The condensers operate in the temperature range of minus 40 to minus 80° C. These condensers 500 and 600 are of a simple design being standard cylindrical vessels 502 and 602 having cooling pipes 508 and 606. These condensers 500 and 600 have hydrogen fluoride (HF) return lines 506 and 606, center gas feed lines 280 and 422, and top gas outlet lines 504 and 604. The cooling pipes 508 and 608 are filled from the top 510 and 610 of each condenser unit 500 and 600.

DETAILED DESCRIPTION OF THE NITROGEN TRIFLUORIDE PROCESS

OVERVIEW

In the production of nitrogen trifluoride ($NF_3$), as will be explained herein, a molten flux 20 is circulated continuously through the solubilizers 100 and 300, the reactor 200, and the electrolyzer 400. The quantity of the molten flux 20 being circulated is maintained substantially constant by adding ammonia to the ammonia solubilizer 100, and by adding hydrogen fluoride (HF) to the hydrogen fluoride solubilizer 300, as they are consumed. The molten flux 20 has a composition as follows:

$$aNH_3 + bMFx + cHF$$

The molar ratio of ammonia ($NH_3$) to metal fluoride (MFx) to hydrogen fluoride (HF) is approximately 3:1:10, respectively.

The electrolyzer 400 produces fluorine ($F_2$) gas 26 and hydrogen ($H_2$) gas 32 and supplies the fluorine ($F_2$) gas 26 to the reactor 200 to react with the molten flux 20 contained therein to produce nitrogen trifluoride ($NF_3$) gas 30. The nitrogen trifluoride ($NF_3$) is collected at condenser 500.

The chemical reactions produced in the electrolyzer 400 for producing fluorine ($F_2$) and hydrogen ($H_2$) gases are as follows:

Cathode reaction: $2H^+ + 2e \rightarrow H_2\uparrow$

Anode reaction: $2F^- - 2e \rightarrow F_2\uparrow$ $$2HF \rightarrow F_2 + H_2 + \Delta H$$

In the nitrogen trifluoride reactor 200 the chemical reaction produced is as follows: $NH_4F + 3F_2 \rightarrow NF_3\uparrow + 4HF + \Delta H$ The equation for the entire process is: $NH_3 + 3HF \rightarrow NF_3 + 3H_2$ If fluorine ($F_2$) gas is added directly to the HF solubilizer 300, to supplement the fluorine from the electrolyzer 400, the equation is: $NH_3 + 3/2 F_2 \rightarrow NF_3 + 3/2 H_2$ It should be noted that the ammonia fluoride ($NH_4F$), designated 36, is produced in the ammonia solubilizer 100 and then reacted with fluorine ($F_2$) gas 26 in reactor 200 and it will not precipitate out and form a solid because of the helium (He) carrier gas 24 used throughout the nitrogen trifluoride process and apparatus 10.

NITROGEN TRIFLUORIDE REACTOR 200

Nitrogen trifluoride ($NF_3$) gas 30 is produced by contacting fluorine ($F_2$) gas 26 with an electrolyte of ammonia acid mineral fluoride which is molten flux 20 in the reactor 200 at a temperature in the range of 140°C. to 160° C. The mole fraction of the hydrogen fluoride (HF) contained in the molten flux 20 is in the range of 65% to 75%. When the reaction takes place, between 1 mole of ammonia ($NH_3$) gas 22 and 3 moles of fluorine ($F_2$) gas 26 are consumed, and 1 mole of nitrogen trifluoride ($NF_3$) gas 30 and 3 moles of hydrogen fluoride (HF) gas 28 are generated. The concentration of hydrogen fluoride (HF) increases from the reference point before the reaction takes place to after the reaction by three (3) moles. The temperature of the reaction is in the range of 140° C. to 160° C. The volatility of hydrogen fluoride (HF) gas 28 is substantially high and significant amounts of hydrogen fluoride (HF) gas 28 are carried out of the reactor 200 together with the nitrogen trifluoride ($NF_3$) gas 30.

In the nitrogen trifluoride reactor 200, there are four (4) stream flows consisting of two (2) inlet pipes 106 and 204, and two outlet pipes 206 and 280. Inlet pipe 106 connected to the reactor 200 carries the molten flux 20 with ammonia acid mineral fluoride, rich in ammonia 22, at a temperature of 100°C. to 120° C. The concentration of hydrogen fluoride (HF) 28 in the molten flux 20 coming from inlet pipe 106 is ≧65 mole %.

Inlet pipe 204 entering into the reactor 200 is a fluorine gas stream 26 that carries mainly molecular fluorine gas 26 but also some other products such as $HF_3$—$NF_3$ and other fluorides of nitrogen as well as a certain amount of inert. The amount of fluorine ($F_2$) gas 26 from inlet pipe 204 will be sufficient to react with all of the ammonia ($NH_3$) gas 22 that was added into the reactor from inlet pipe 106. The temperature of the fluorine ($F_2$) gas 26 is mainly the temperature of the electrolyzer molten flux 20 being between 40° C. to 65° C.

Outlet pipe 206 carries the molten flux 20 of ammonia acid mineral fluorine which is weak in ammonia ($NH_3$) concentration 22 to the hydrogen fluoride solubilizer 300. The concentration of hydrogen fluoride (HF) 28 in the molten flux 20 of the ammonia acid mineral fluoride is greater than 65 mole % but less than 75 mole %. The temperature of this molten flux 20 stream in the nitrogen trifluoride reactor 200 is in the range of 140° C. to 160° C.

Outlet pipe 280 contains the nitrogen trifluoride ($NF_3$) gas 30 generated in the nitrogen trifluoride reactor 200. The nitrogen trifluoride ($NF_3$) gas 30 also carries the hydrogen fluoride (HF) gas 28 minus the concentration of fluorides of nitrogen such as $N_2F_2, N_2F_4$ and inert. There may be some other impurities present such as $CO_2$, CO, $NO_x$, $CF_4$ and $SF_6$ but all of these impurities are at a very low part per million (ppm) level. As is described in the previous paragraph, the nitrogen trifluoride reactor 200 that generates nitrogen trifluoride ($NF_3$) gas 30 has two streams that are entering the reactor: one being the molten flux 20 and the other is the fluorine ($F_2$) gas stream 30 via inlet pipes 106 and 204; and two streams exiting the reactor: one being the molten flux 20 and the other being the nitrogen trifluoride ($NF_3$) gas stream via outlet pipes 206 and 280, respectively.

HYDROGEN FLUORIDE SOLUBILIZER 300

Molten flux 20 via outlet pipe 206 from the nitrogen trifluoride reactor 200 is the feed stream to the hydrogen fluoride solubilizer 300. Outlet pipe 206 carries the molten flux 20 of ammonia acid mineral fluoride to the flux tank section 302 of hydrogen fluoride solubilizer 300. The concentration of hydrogen fluoride (HF) 28 in this stream is greater than 65% and less than 75%. The temperature of the molten flux 20 is in the range of 140°–160° C.

Inlet pipes 318 and 322 supply helium (He) and hydrogen fluoride (HF) gases 24 and 28, respectively, and any other condensate material that can be carried with the helium (He) carrier gas 24, to the spargers 316a, 316b, 316c, and 316d of hydrogen fluoride solubilizer 300. The temperature of the hydrogen fluoride (HF) and helium (He) gas streams are in the range of minus 40° C. to minus 80° C. The amount of hydrogen fluoride (HF) gas 28 carried by this stream via pipe 322 is equal to or less than the stoichiometric amount required to make the necessary fluorine ($F_2$) gas 26 for the process.

The other stream via outlet pipe 306 of the hydrogen fluoride solubilizer 300 carries out molten flux 20 to the electrolyzer 400. The temperature of this molten flux 20 stream is in the range of 40°–60° C. The molten flux 20 carried in outlet pipe 306 is rich in hydrogen fluoride (HF) 28 but with a concentration of less than 75 mole %.

NITROGEN TRIFLUORIDE/HYDROGEN FLUORIDE CONDENSER 500

Outlet pipe 280 is connected to the nitrogen flouride reactor 200 and passes the nitrogen triflouride ($NF_3$) and hydrogen fluoride (HF) gases 30 and 28 through a condenser cooling zone 508 at a temperature range of 200° C. to 250° C. where the gas velocity is 1 foot per second or less. The nitrogen triflouride ($NF_3$) and hydrogen fluoride (HF) gases 30 and 28 that enter into the nitrogen trifluoride/hydrogen fluoride condenser 500 are such that the temperature of the nitrogen trifluoride ($NF_3$) gas 30 and other gaseous compounds are lowered by cooling to a dry ice temperature inside the condenser 500 by cooling tubes 508. The majority of the hydrogen fluoride (HF) gas 28 that comes from outlet pipe 280 is condensed and collected from condenser 500.

All of the hydrogen fluoride (HF) gas 28 condensing in the nitrogen trifluoride/hydrogen fluoride condenser 500 is transferred to the hydrogen fluoride solubilizer 300 through outlet pipe 506. Outlet pipe 280 carries the nitrogen trifluoride ($NF_3$) product 30 with enough condensible impurities that pass through the nitrogen trifluoride/hydrogen fluoride condenser 500.

The pipe 280 is heated to a temperature range of 200° C. to 250° C., such that the linear velocity of the gases in pipe 280 are less than 1 ft./sec. and the preferential range is 0.3 to 0.6 ft./sec. The outlet pipe 280 is made from 3" schedule 10 monel 400 and is approximately 6 feet in length.

FLUORINE ELECTROLYZER 400

Outlet pipe 306 from the HF solubilizer 300 supplies molten flux 20 to the fluorine electrolyzer 400. The temperature of molten flux 20 entering into the fluorine electrolyzer 400 is in the range of 40° C. to 60° C. The electrolyte solution coming from outlet pipe 306 is greater than 65 mole %. The electrolyte from molten flux 20 has the proper composition of ammonia acid mineral fluoride for the necessary conductivity in the electrolysis of hydrogen fluoride (HF) 28 component being a low voltage without large amounts of heat dissipation.

Outlet pipe 406 of the electrolyzer 400 carries the hydrogen ($H_2$) gas 32 product of the electrolysis to the hydrogen/hydrogen fluoride condenser 600. Inlet pipe 204 carries the fluorine ($F_2$) gas 26 generated by the electrolyzer 400 with some hydrogen fluoride (HF) gas 28 and other nitrogen fluorides to the nitrogen trifluoride reactor 200.

Pipe 104 carries out molten flux 20 that is electrolyte weak in hydrogen fluoride (HF). The ammonia acid mineral fluoride solution or flux 20 is transferred to the ammonia solubilizer 100. The molten flux 20 has a range of temperature between 40° C. to 60° C.

The molten flux 20 is a mineral acid solvent used in this process to perform a number of functions. It provides the electrolysis of hydrogen fluoride (HF) that forms fluorine ($F_2$) and hydrogen ($H_2$) gases 26 and 32, respectively. In addition, the electrolyte is a solvent that absorbs the injected ammonia to enrich itself and a solvent that absorbs injected hydrogen fluoride (HF) to enrich itself. It also provides a reaction medium to produce $NF_3$.

The molten flux 20 is an electrolyte system of ammonia ($NH_3$) 22, potassium fluoride (KF) 34, and hydrogen fluoride (HF) 28. In order to prevent crystallization or solid formation in the molten flux 20, the melting point has to be achieved. The melting point curve has to be determined in order to determine the range of operation for this process. This molten flux 20 system is composed of three components that are soluble and react with each other. By using known data of the melting points of ($NH_3$—HF) and (KF—HF) systems, the molten flux 20 melting point can be achieved.

For all practical purposes each of the systems mentioned ($NH_3$—HF) and (KF—HF) are a two component system. ($NH_3$—HF) is derived from ammonia and hydrogen fluoride. (KF—HF) is derived from potassium fluoride and hydrogen fluoride. The molten flux 20 is a new three component system derived from ($NH_3$—HF) and (KF—HF) systems being ammonia ($NH_3$), potassium fluoride (KF) and hydrogen fluoride (HF) in an electrolyte-liquid medium.

The molten flux 20 runs through the entire system. The reactor 200 and the electrolyzer 400 are the critical zones of this process. When the molten flux 20 runs through the reactor 200, the ammonia ($NH_3$) component 22 has to be in a sufficient quantity to react with all of the injected fluorine ($F_2$) gas 26 to form nitrogen trifluoride ($NF_3$) gas 30. The temperature has to be sufficiently high to prevent any by-product formation. When the molten flux 20 (electrolyte) runs through the electrolyzer, proper electro-conductivity and temperatures are required.

The electro-conductivity of molten flux 20 (electrolyte-liquid medium) has to be sufficiently high so that the resistance between the electrodes is minimum. If the molten flux 20 achieves high electro-conductivity, the life of the electrolyzer is preserved due to the small amount of heat being generated.

The temperature of the molten flux 20 (electrolyte-liquid medium) has to be sufficiently high to keep the electrolyte free of crystallization or solid formation; and sufficiently low to preserve the life of the electrolyzer. To prevent crystallization or solid formation, the electrolyte must be 15° C. above the melting point of the electrolyte.

Figure 8:
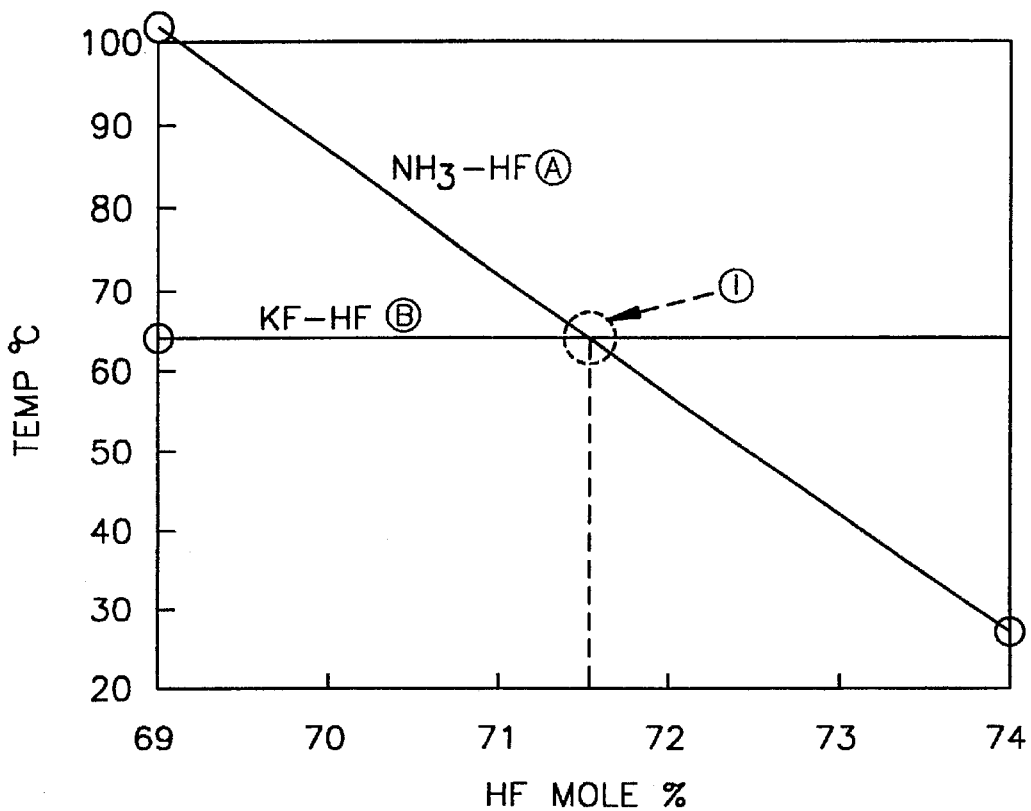
FIG. 8 is a phase diagram showing system composition versus melting of the molten flux system used in the electrolyzer.

By knowing the melting point curve of the systems $NH_3$-HF and KF-HF, as shown in FIG. 8, the melting point curve of the molten flux or electrolyte system can be obtained. The intersection of curves A and B indicates the common melting point and HF mole % of the two systems ($NH_3$—HF and KF—HF). The common component in the two systems ($NH_3$—HF and KF—HF) is hydrogen fluoride (HF). This melting point curve of the molten flux 20 system is lower than either of the two $NH_3$—HF and KF—HF systems. These systems $NH_3$—HF and KF—HF have a common melting point of 64° C. at a hydrogen fluoride (HF) concentration of 71.5 mole %. By using the common melting point of the above two systems, the correlation of the melting point curve for the molten flux 20 system can be established, as depicted in FIG. 8.

Figure 9:
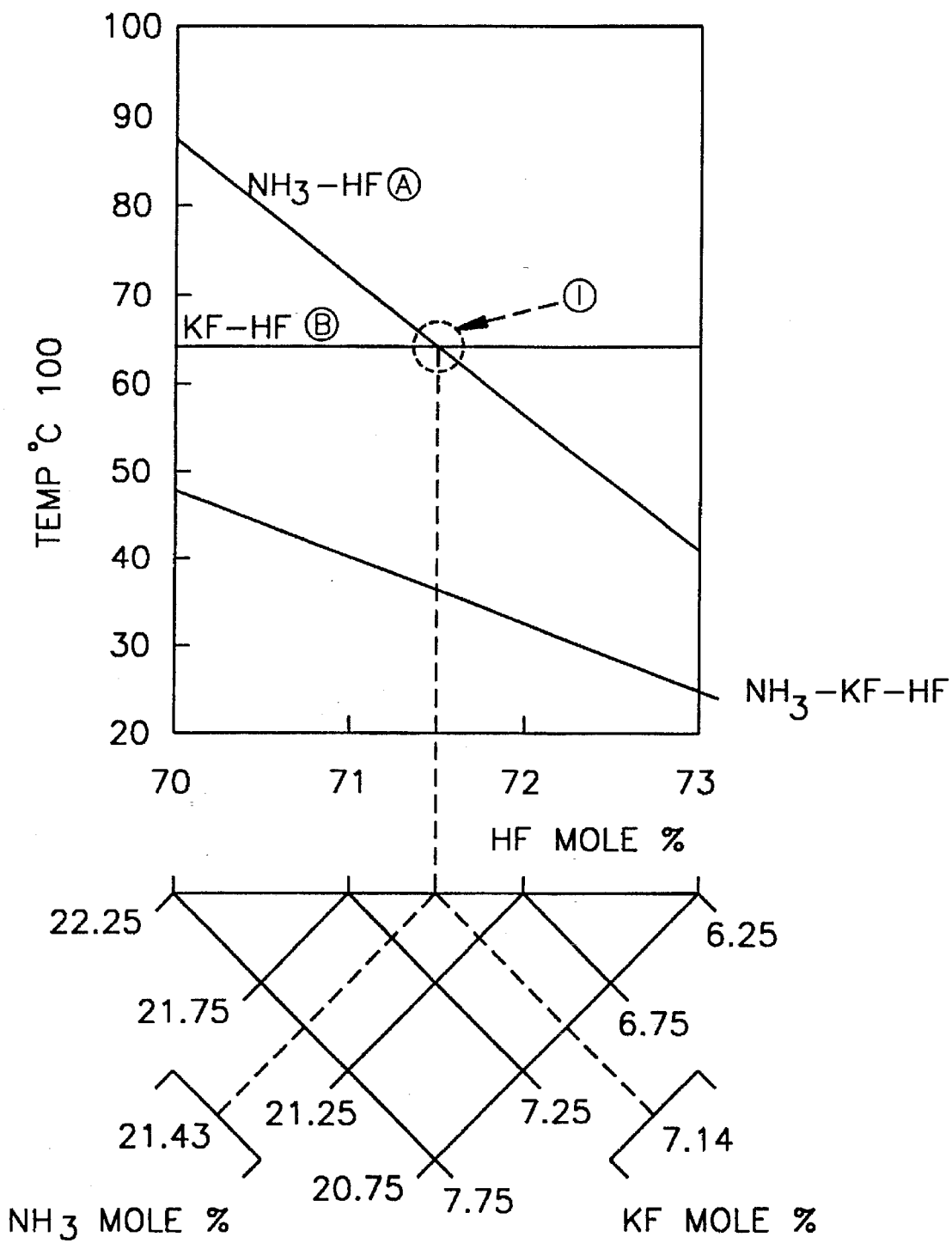
FIG. 9 is a molten flux range triangular diagram for assessing the correct molar ratios of ammonia, potassium fluoride and hydrogen fluoride.

The systems ($NH_3$—HF) and (KF—HF) provide sufficient electroconductivity at the concentration of 71.5 mole % of HF. Since 71.5% mole of hydrogen fluoride (HF) achieves the proper electroconductivity, a 5 mole % range of hydrogen fluoride (HF) is established being 2½% above and below 71.5% mole of hydrogen fluoride (HF). By combining the data, as shown in the triangular diagram of FIG. 9, the two systems ($NH_3$—HF) and (KF—HF) and the range of operation (±2.5% mole from reference point 71.5% mole of HF), the molten flux 20 system is obtained for the processing of nitrogen trifluoride ($NF_3$) gas 30. The triangular diagram of FIG. 9 is used to obtain the composition of each component in the selected 5 mole % HF range.

Eight different compositions of the three components ($NH_3$, KF, HF) that form the molten flux 20 have been derived form the triangular diagram. In order to obtain the melting point curve of the molten flux 20, the melting points of the eight different compositions were observed in Table 1.

TABLE 1

MELTING POINT OF MOLTEN FLUX SYSTEM
Experimental Melting Point of Molten Flux System
$NH_3$—KF—HF

| Run | Mole % | | | Temperature Readings °C. | | | T °C. Ave. Reading |
|-----|------|------|-----|----|----|----|----|
|     | HF   | $NH_3$ | KF  | R1 | R2 | R3 |    |
| 1   | 71.0 | 20.5 | 8.5 | 38 | 40 | 38 | 39 |
| 2   | 72.0 | 20.0 | 8.0 | 32 | 34 | 33 | 33 |
| 3   | 69.7 | 21.1 | 9.2 | 48 | 47 | 49 | 48 |
| 4   | 69.0 | 21.5 | 9.5 | 52 | 50 | 51 | 51 |
| 5   | 71.1 | 20.5 | 8.4 | 38 | 40 | 38 | 39 |
| 6   | 69.8 | 20.6 | 9.6 | 47 | 45 | 48 | 47 |
| 7   | 72.0 | 19.9 | 8.2 | 32 | 29 | 33 | 32 |
| 8   | 68.3 | 22.3 | 9.4 | 60 | 56 | 58 | 58 |

Figure 10:
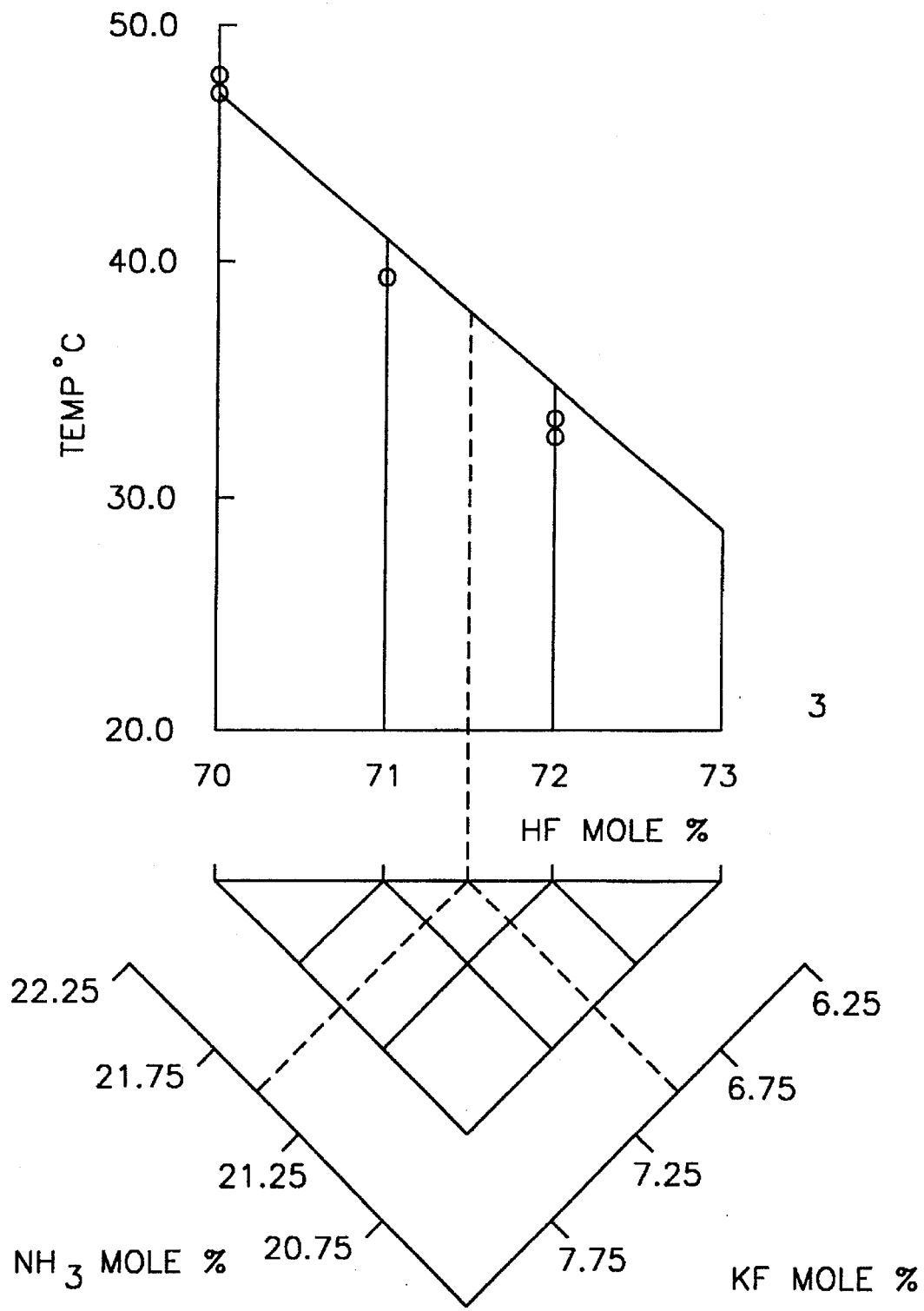
FIG. 10 is a melting point and composition diagram for the ($NH_3$-KF-HF) molten flux system used in the electrolyzer.

In FIG. 10, the eight data points of Table 1 are plotted and reflect the melting point curve of the molten flux 20 system for processing of the nitrogen trifluoride ($NF_3$) gas 30 of the present invention.

HYDROGEN/HYDROGEN FLUORIDE CONDENSER 600

Outlet pipe 422 carries out the hydrogen ($H_2$) gas 32 and hydrogen fluoride (HF) gas 28 from the electrolyzer 400 and these gases pass through the hydrogen/hydrogen fluoride condenser 600. The hydrogen fluoride from outlet pipe 422 condenses and is transferred back into the condenser zone 602 to the electrolyzer 400 through outlet pipe 606.

The main function of the hydrogen/hydrogen fluoride condenser 600 is the removal of hydrogen fluoride (HF) gas 28 from pipe 422 carrying the hydrogen ($H_2$) and hydrogen fluoride (HF) gas streams 32 and 28, respectively.

AMMONIA SOLUBILIZER 100

Inlet pipe 104 carries molten flux 20 into the ammonia solubilizer 100 at a temperature in the range of 40° C. to 60° C. Inlet pipes 118 and 122 carry helium (He) gas 24 and ammonia ($NH_3$) gas 22 into the solubilizer 100. The ammonia ($NH_3$) gas 22 is solubilized or dissolved in the molten flux 20 (ammonia acid mineral fluoride) while the helium (He) passes through the flux. The helium (He) gas 24 prevents the plugging of the sparger with the ammonium fluoride ($NH_4F$) solid 36. The molten flux 20 is rich in ammonia ($NH_3$) and is transferred into the reactor 200 at a temperature between 120° C. and 130° C.

The steps described above constitute the process for the manufacturing of nitrogen trifluoride $NF_3$ in accordance with the present invention, as shown in the drawings.

ADVANTAGES OF THE PRESENT INVENTION

Accordingly, an advantage of the present invention is that it provides for an efficient process and apparatus for continuously and automatically producing nitrogen trifluoride ($NF_3$) and hydrogen ($H_2$) from ammonia ($NH_3$) and hydrogen fluoride (HF) using a single molten flux.

Another advantage of the present invention is that it provides for a process which is continuous, controllable and automated such that the nitrogen fluoride ($NF_3$) is obtainable without product deterioration (a high quality product is produced) and without any by-products being produced since they are undesirable.

Another advantage of the present invention is that it provides for a high purity and a high quality of nitrogen trifluoride ($NF_3$) and hydrogen ($H_2$) which is free from contaminates and impurities such as dinitrogen fluoride ($N_2F$), tetrafluorohydrazine ($N_2F_2$), nitrogen oxides ($NO_x$), or solid ammonium fluoride ($NH_4F$).

Another advantage of the present invention is that it provides for a system including an electrolyzer, a reactor vessel and solubilizers connected together so that a molten flux 20 liquid flows through them continuously, and wherein ammonia ($NH_3$) and hydrogen fluoride (HF) are introduced into the system and nitrogen trifluoride ($NF_3$) and hydrogen ($H_2$) are produced by the system.

Another advantage of the present invention is that it provides for a molten flux 20 containing ammonia ($NH_3$), a metal fluoride ($MF_x$) such as potassium fluoride (KF), and hydrogen fluoride (HF), at molar ratios of approximately 3:1:10, respectively.

Another advantage of the present invention is that it provides for an ammonia solubilizer apparatus wherein the solid formation of ammonia fluoride ($NH_4F$) is prevented when ammonia ($NH_3$) is added to the solubilizer, as a result of the simultaneous introduction of helium (He) gas to the solubilizer with the $NH_3$.

Another advantage of the present invention is that it provides for a nitrogen trifluoride reactor apparatus having evaporating/cooling components contained therein for removing the exothermic heat of reaction ($\Delta T$) of the process and heater components for heating the molten flux 20 to the proper temperature range for an efficient process reaction to take place.

Another advantage of the present invention is that it provides for helium ($H_3$) gas as a carrier gas for ammonia ($NH_3$) and hydrogen fluoride (HF) through the vessels of the present invention in order to avoid explosions and provide a safe process.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A method for the production of nitrogen trifluoride ($NF_3$) and hydrogen ($H_2$) gas, starting with a molten flux including at least ammonia ($NH_3$), a metal fluoride, and hydrogen fluoride (HF), comprising the steps of:

a) circulating said molten flux from an electrolyzer, to an ammonia solubilizer, to a nitrogen trifluoride reactor, to a hydrogen fluoride solubilizer, and back to said electrolyzer;

b) maintaining the quantity of said molten flux substantially constant by adding ammonia ($NH_3$) and a carrier gas to said ammonia solubilizer and by adding hydrogen fluoride (HF) and a carrier gas to said hydrogen fluoride solubilizer;

c) producing fluorine ($F_2$) gas and hydrogen ($H_2$) gas in said electrolyzer;

d) transferring said carrier gas from at least one of said solubilizers to said nitrogen trifluoride reactor;

e) mixing said fluorine gas and said carrier gas and supplying said mixed gases to said nitrogen trifluoride reactor;

f) reacting said fluorine gas with said molten flux in said nitrogen trifluoride reactor to produce nitrogen trifluoride ($NF_3$); and g) collecting said nitrogen trifluoride ($NF_3$) produced at a nitrogen trifluoride condenser and collecting said hydrogen ($H_2$) produced at a hydrogen condenser.

2. A method in accordance with claim 1, wherein said carrier gas is helium gas (He) or neon gas.

3. A method in accordance with claim 1, wherein the steps of adding ammonia ($NH_3$) gas to said ammonia solubilizer and adding hydrogen fluoride (HF) to said hydrogen fluoride solubilizer are performed by helium (He) gas as said carrier gas.

4. A method in accordance with claim 1, further including the step of removing hydrogen fluoride (HF) from the hydrogen ($H_2$) gas received from said electrolyzer which is performed by said hydrogen condenser and further including the step of supplying the removed hydrogen fluoride (HF) to said electrolyzer to produce additional hydrogen ($H_2$) gas and fluorine ($F_2$) gas.

5. A method in accordance with claim 1, wherein said metal fluoride is potassium fluoride (KF), nickel fluoride ($NiF_2$), magnesium fluoride ($MgF_2$), aluminum fluoride ($AlF_3$), sodium fluoride (NaF), lithium fluoride (LiF), or calcium fluoride ($CaF_2$).

6. A method in accordance with claim 1, wherein said metal fluoride is potassium fluoride.

7. A method in accordance with claim 6, further including the step of maintaining the molar percentage (mole %) of ammonia ($NH_3$) in said molten flux within a range of 20¾ mole % to 22¼ mole % in said system, and maintaining the molar percentage (mole %) of potassium fluoride (KF) in said molten flux within a range of 6¼ mole % to 7¾ mole % in said system, and maintaining the molar percentage (mole %) of hydrogen fluoride (HF) in said molten flux within a range of 70 mole % to 73 mole % in said system.

8. A method in accordance with claim 6, further including the step of maintaining the molar percentage (mole %) of ammonia ($NH_3$) in said molten flux at 21.43 mole % ±½ mole % in said system, and maintaining the molar percentage (mole %) of potassium fluoride (KF) in said molten flux at 7.14 mole % ±½ mole % in said system, and maintaining the molar percentage (mole %) of hydrogen fluoride (HF) in said molten flux at 71.43 mole % ±½ mole % in said system.

9. A method in accordance with claim 6, wherein the molar ratio of said molten flux is 3 moles of ammonia to 1 mole of potassium fluoride to 10 moles of hydrogen fluoride.

10. A method in accordance with claim 1, further including the step of changing the temperature of said molten flux from 60° C. to 120° C. in said ammonia solubilizer.

11. A method in accordance with claim 1, further including the step of changing the temperature of said molten flux from 100° C. to 160° C. in said nitrogen trifluoride reactor.

12. A method in accordance with claim 1, further including the step of changing the temperature of said molten flux from 160° C. to 60° C. in said hydrogen fluoride solubilizer.

13. A method in accordance with claim 1, further including the step of changing the temperature of said molten flux from 60° C. to 40° C. in said electrolyzer.

14. A method in accordance with claim 1, further including the step of maintaining the temperature of cooling elements in said nitrogen trifluoride condenser within a range of −80° C. to −40° C. for the recovery of nitrogen trifluoride ($NF_3$) and hydrogen fluoride (HF) from said reactor.

15. A method in accordance with claim 1, further including the step of maintaining the temperature of cooling elements in said hydrogen condenser within a range of −80° C. to −40° C. for the recovery of hydrogen ($H_2$) and hydrogen fluoride (HF) gases from said electrolyzer.

16. A method in accordance with claim 1, further including the step of cooling said molten flux in said ammonia solubilizer, said hydrogen fluoride solubilizer, and said nitrogen trifluoride reactor.

17. A method in accordance with claim 16, further including the step of collecting vapor produced by said cooling step and condensing said vapor into a liquid for reuse in said cooling step.

18. A method in accordance with claim 17, further including the step of maintaining the pressure of said vapor at a level of at least 50 psig and maintaining the temperature of said vapor at a minimum of 160° C.

19. A method in accordance with claim 16, wherein the step of cooling said molten flux is performed by using water or steam at a temperature in the range of 60° C. to 160° C.

20. A method in accordance with claim 1, further including the step of mixing said molten flux in said ammonia solubilizer, said hydrogen fluoride solubilizer, and in said nitrogen trifluoride reactor.

21. A method in accordance with claim 1, further including the step of removing said molten flux from the nitrogen trifluoride ($NF_3$) gas produced by passing said nitrogen trifluoride ($NF_3$) gas through a demister pipe.

22. A method for producing fluorine ($F_2$) gas in a first chamber and for producing nitrogen trifluoride ($NF_3$) in a second chamber using a molten flux in said first and second chambers, comprising the steps of:

a) circulating said molten flux between said first and second chambers, said molten flux including at least ammonia ($NH_3$), a metal fluoride, and hydrogen fluoride (HF);

b) adding ammonia ($NH_3$) and hydrogen fluoride (HF) to said molten flux to replace what is consumed;

c) producing fluorine ($F_2$) gas in said first chamber by electrolysis of said hydrogen fluoride;

d) supplying said fluorine ($F_2$) gas from said first chamber to said second chamber;

e) producing nitrogen trifluoride ($NF_3$) in said second chamber by reacting said fluorine ($F_2$) gas from said first chamber with said molten flux without using electrolysis; and f) collecting said nitrogen trifluoride ($NF_3$) produced in said second chamber.

23. A method in accordance with claim 22, wherein the steps of adding ammonia ($NH_3$) and hydrogen fluoride (HF) to said molten flux and supplying said fluorine ($F_2$) gas to said second chamber are performed by using a carrier gas.

* * * * *